Aug. 14, 1923.
I. C. WOODWARD
1,464,795
DIFFERENTIAL GEAR CONTROL MECHANISM
Filed Feb. 21, 1923
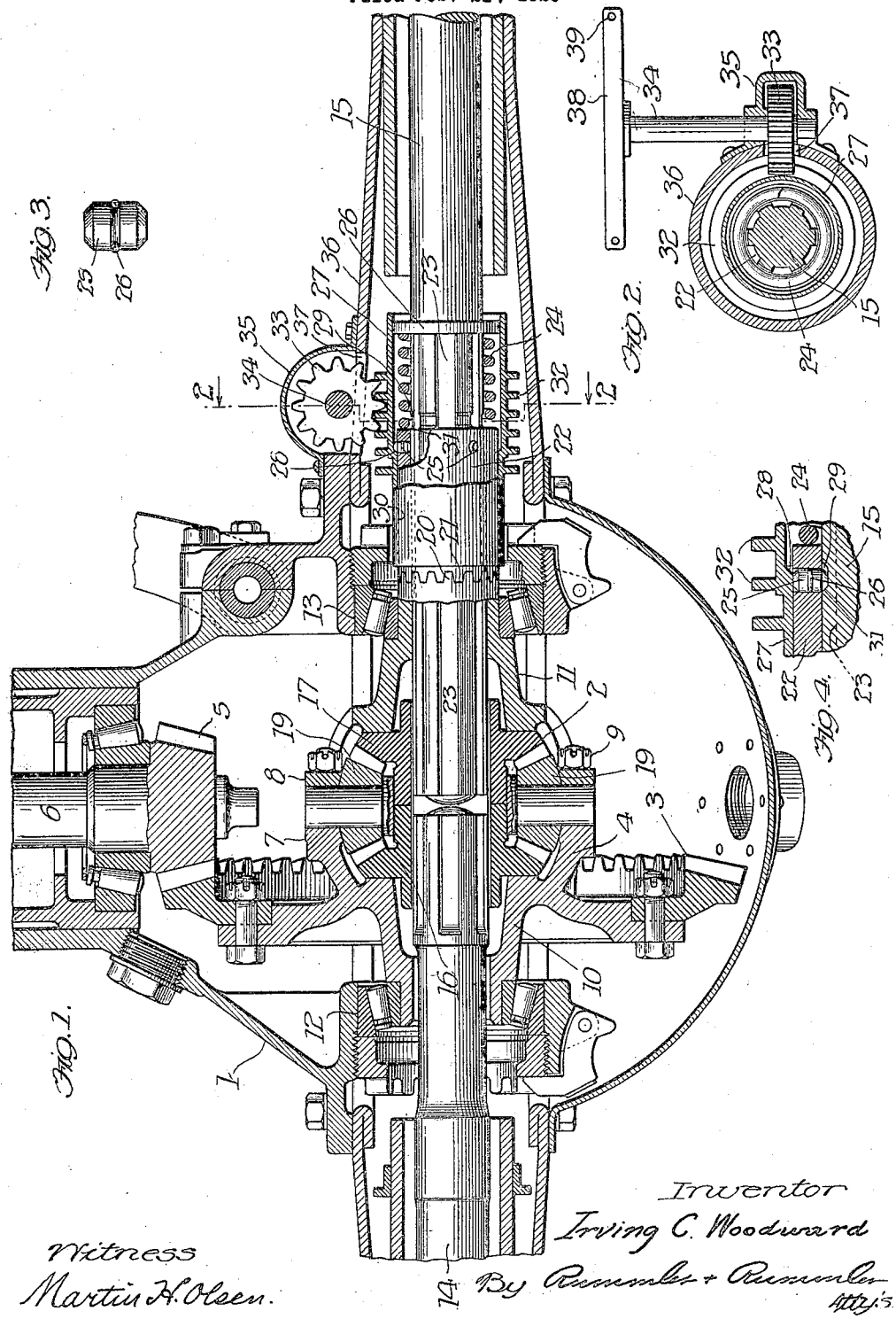
Witness
Martin H. Olsen.
Inventor
Irving C. Woodward
By Rummler + Rummler
Atty's Patented Aug. 14, 1923.

1,464,795

UNITED STATES PATENT OFFICE.

IRVING C. WOODWARD, OF SYRACUSE, NEW YORK.

DIFFERENTIAL-GEAR CONTROL MECHANISM.

Application filed February 21, 1923. Serial No. 620,336.

*To all whom it may concern:*

Be it known that I, IRVING C. WOODWARD, a citizen of the United States of America, and a resident of Syracuse, county of Onondaga, and State of New York, have invented a new and useful Improvement in Differential-Gear Control Mechanisms, of which the following is a specification.

This invention relates to differential gear control mechanisms of the type described in applicant's Patent No. 1,355,297, October 12, 1920.

The objects of the invention are to provide improvements in the clutch operating mechanism whereby this mechanism is simplified, made more compact and improved in its operation.

The device herein described in principle is similar to the patented construction above referred to. Both designs are based upon the fact that differential action in vehicle drive mechanisms, in so far as actually required, is a comparatively slow motion and of slight extent, and, therefore differential gears are improved by being made controllable to prevent undue motion therein. Most uncontrolled differential gears operate satisfactorily, except for a tendency thereof, when road conditions permit, to produce a difference in motion between the two driven axles when not required or far in excess of that which is required. Differential gears when operating properly, should compensate only for irregularities in road surfaces, and the difference between the curves passed through by the two driven wheels when the vehicle is following a curved path or making a turn. The normal maximum difference in rate of rotation required of the two driven shafts is on short turns. If the vehicle is traveling in a curve of large radius, the difference of motion between the two driven axles is the same as on curves of short radius, but is extended over a greater time and length of travel of the vehicle. The differential action which is necessary for the proper operation of the driving mechanism is extremely slight. Even for a full 360° turn of any radius, one wheel should rotate more or less than the other only the length of a circle, the radius of which is the distance between the drive wheels. But excess differential motion such as occurs when the brakes are applied and one engages slightly in advance of the other, is extremely dangerous, resulting in a turning torque and possible side slipping of the vehicle.

To correct the action of standard differential mechanisms, applicant has provided a restraining device for the differential, which may be caused to check differential action and thus eliminate harmful motion by more or less compelling the two driven axles to rotate together, but always permitting the proper slight differential rotation of the shafts before any part of the mechanism becomes strained or liable to break under the effort to transmit the driving torque through the axle of the inside wheel or the wheel having best traction. Likewise, this device protects the axles from the excessive strain resulting from a wheel suddenly obtaining good traction after idly speeding with little or no traction, since it never permits the racing of a wheel.

The desired result is obtained by modifying the standard bevel gear differential mechanism only to the extent of providing clutch teeth on one of the hubs of the pinion-supporting housing and slidably mounting on the splined end of one of the axles an automatically releasable coacting clutch member and a manually controlled means for engaging this coacting clutch member with the clutch member formed on one of the hubs of the differential housing. The clutch members have inclined teeth and are held in engagement by a spring. The inclination of the teeth and the strength of the spring is arranged so that with any given rear axle construction the clutch members will be momentarily cammed out of engagement with each other, due to the inclination of their teeth, when the stresses produced by effort to differentiate between the axles reach a predetermined amount.

Improved means are provided for engaging and disengaging the clutch and for retaining the movable member of the clutch in either of its set positions.

The purposes of the invention may be accomplished by a construction such as shown in the accompanying drawing, wherein:—

Figure 1 is a fragmentary plan view in section, of the rear axle part of a vehicle drive mechanism equipped with the present improvements.

Figure 2 is a sectional detail taken on the line 2—2 of Figure 1.

Figure 3 is a detail view of one of the locking pins for retaining the movable member of a clutch in disengaging position.

Figure 4 is an enlarged sectional detail illustrating how the clutch is retained in disengaged position.

The drawing illustrates a standard construction of well-known design, except for the few additions required by the present improvements. The well-known parts of the construction constitute a rear axle housing 1 enclosing the well-known differential gearing 2, and ring gear 3 supported by the casing 4 of the differential gearing and meshing with pinion 5 secured to the propeller shaft 6. The differential gear casing 4 is made in two parts, 7 and 8, clamped together by the cap screws 9, and each having an extended hub 10 and 11, respectively, surrounding which are the bearings 12 and 13. The axles 14 and 15 are splined in the customary way to the beveled gears 16 and 17 of the differential gearing and which mesh with the intermediate pinions 19.

For the purposes of the present improvements, the hub 11 of the part 8 of the differential gear casing extends slightly beyond bearing 13 and at this end is provided with inclined teeth 20 for coacting with similarly inclined teeth 21 on a sleeve 22 splined to engage the extended splines 23 on axle 15. A helical spring 24 normally urges the teeth 21 on the clutch element or sleeve 22 into engagement with the teeth 20 on hub 11 of the differential gear casing. The sleeve 22 is drilled radially to receive a plurality of pins 25 in positions to rest upon the tops of splines 23. These pins are preferably centrally grooved to receive retaining springs or clips 26 which serve to frictionally retain the pins in the holes in the sleeve before and during the assembly of the mechanism. The clutch member 22 and the spring 24 which bears between the clutch member and a washer 26 fitting the splined part of axle 15, are surrounded by a sleeve 27, which has an annular and inclined internal shoulder 28 for engagement with the pins 25. Thus, if sleeve 27 is shifted to the right, Figure 1, it will engage the pins and the clutch member 22 and move the clutch to disengaged position. When the teeth 21 are disengaged from the teeth 20, the pins 25 are cammed downwardly by the shoulders 28 into recesses 29 cut in the surfaces of splines 23. The sleeve 27 in its continued motion, moves relatively to the pins 25, the reduced diameter 30 of the sleeve engaging the outer surfaces of the pins. The clutch is by this means locked in its disengaged position, Figure 4, as due to the reduced diameter 30 of the sleeve 27, the pins cannot ride up over shoulders 31 at the inner ends of recesses 29.

For the purpose of shifting sleeve 27 to the right or left in order to operate clutch element 22, the sleeve 27 is provided with a series of annular rack teeth 32. The rack teeth 32 mesh with a pinion 33 fast to a vertical shaft 34 having bearings in a bracket 35 secured to the axle casing tube 36. This tube has a small opening 37 through which the gear 33 extends. The shaft 34 is provided with an arm 38 to which are attached small twisted wire lines 39, leading over pulleys to the dash board of the vehicle in convenient location for operation by the driver.

In the operation of the device, assuming that clutch 22 is in the position indicated in Figure 1, the axles 14 and 15 will rotate at the same rate due to the clutch connection beween axles 15 and the casing 4 of the differential gearing. The clutch element 22 must always rotate with axle 15, because of the splined connection therewith, as indicated in Figure 2, but due to the inclination of teeth 20 and 21, if there is sufficient effort to differentiate in speed between the axles 14 and 15, clutch 22 is cammed out of engagement with the teeth on hub 11, thus permitting a relative rotation between axles 14 and 15. The clutch 22 will, however, immediately reengage the teeth on hub 11 after a slight relative motion between the axles, and may again be disengaged and reengaged so long as there is sufficient difference in resistance between the two driven wheels to cause such action of the clutch mechanism. The inclination of teeth 20 and 21 and the strength of spring 24 is arranged to permit the unclutching movement at any desired torsional effort between the axles 14 and 15. In this manner while undue differential action is prevented, a limited differential motion is permitted between the two axles before the mechanism becomes unduly strained.

During normal driving under good road conditions free action of the differential mechanism may be desired; therefore, the clutch 22 may be disengaged and held in its disengaged position by a partial rotation of shaft 34 in a left-hand direction, Figure 1. The gear 33 by engagement with the annular rack teeth 32 on sleeve 27 causes this sleeve to shift to the right and carry with it through the pins 25, the clutch element 22, which is splined to axle 15. After pins 25 have been forced into the recesses 29 and splines 23, the shoulder 28 on sleeve 27 passes the pins 25, and the reduced diameter 30 of the sleeve then serves to lock the pins against movement out of the recesses 29. The clutch element 22 is in this manner locked out of engagement with the teeth on hub 11.

By reversely rotating shaft 34, the sleeve 27 is shifted far enough to the left, Figure 1, to permit the pins to ride over the inclined shoulders 31 of recesses 29 under the action of spring 24 in forcing the clutch member 22 back to reengaging position.

Although but one specific embodiment of this invention has been herein shown and described, it will be understood that numerous details of the construction shown may be altered or omitted without departing from the spirit of this invention as defined by the following claims:

I claim:

1. In a mechanism of the class described, a pair of axles, differential gearing connecting said axles, means for driving said differential gearing, a casing for said differential gearing, having inclined clutch teeth formed thereon, a clutch member having inclined teeth for coacting with the teeth on said differential gear casing, said clutch member being splined to one of said axles, a spring for urging said clutch member into engagement with the teeth on the gear casing, means for disengaging said clutch member, comprising a sleeve arranged for shifting said clutch member against the action of said spring and being provided with rack teeth, and a pinion for engaging said rack teeth.

2. In a mechanism of the class described, a pair of driven axles, differential gearing connecting said axles, means for driving said differential gearing, a casing for said differential gearing, having inclined clutch teeth formed thereon, a clutch member having inclined teeth for coacting with the teeth on said differential gear casing, said clutch member being splined to one of said axles, a spring for urging said clutch member into engagement with the teeth on the gear casing, means for disengaging said clutch member, comprising a sleeve arranged for shifting said clutch member against the action of said spring and being provided with annular rack teeth, and a pinion for engaging said rack teeth.

3. A mechanism of the class described, comprising a pair of axles connected by a differential gearing carrying inclined clutch teeth, a coacting clutch element in the form of a sleeve splined to one of said axles, and provided with radial holes within which are mounted pins, a sleeve surrounding said clutch member provided with a shoulder for engagement with said pins for the purpose of shifting said clutch member, and recesses in said axles which are entered by said pins after the clutch is disengaged, said shoulder then serving to lock the clutch in disengaged position by bearing on the outer surfaces of said pins.

4. A mechanism of the class described, comprising a pair of axles connected by a differential gearing carrying inclined clutch teeth, a coacting clutch element in the form of a sleeve splined to one of said axles, and provided with radial holes within which are mounted pins, a sleeve surrounding said clutch member provided with an inclined shoulder for engagement with said pins for the purpose of shifting said clutch member, recesses in said axle which are entered by said pins after the clutch is disengaged, due to the camming action of said shoulder, said shoulder then serving to lock the clutch in disengaged position by bearing on the outer surfaces of said pins, means for shifting said sleeve, and a spring for urging the clutch into engagement.

Signed at Syracuse, New York, this 16th day of Feb., 1923.

IRVING C. WOODWARD.